United States Patent [19]

Eaves et al.

[11] Patent Number: 4,472,717
[45] Date of Patent: Sep. 18, 1984

[54] INTRAPULSE POLARIZATION AGILE RADAR SYSTEM (IPAR)

[75] Inventors: Jerry L. Eaves, Mableton, Ga.; Bobby C. Appling, Orlando, Fla.

[73] Assignee: The United States of America as represented by the Secretary of the Army, Washington, D.C.

[21] Appl. No.: 359,646

[22] Filed: Mar. 19, 1982

[51] Int. Cl.³ ............................................. G01S 13/00
[52] U.S. Cl. ........................... 343/5 SA; 343/17.2 PC; 343/361
[58] Field of Search .............. 343/17.2 PC, 5 SA, 361

[56] References Cited

U.S. PATENT DOCUMENTS 4,053,882 10/1977 Van Ehen ......................... 343/361 X
4,107,678 8/1978 Powell ................................ 343/361
4,241,347 12/1980 Albanese et al. ............ 343/17.2 PC

OTHER PUBLICATIONS

M. I. Skolnik: *Introduction to Radar Systems*, McGraw-Hill 1962 p. 493.

Primary Examiner—Theodore M. Blum
Assistant Examiner—Gilberto Barrón, Jr.
Attorney, Agent, or Firm—Anthony T. Lane; Robert P. Gibson; Robert C. Sims

[57] ABSTRACT

This concept makes use of intrapulse polarization agility to achieve pulse compression and correlation with the result that discrimination is accomplished between man-made-like objects and natural objects. A power divider allows the two power components to be simultaneously applied to a dual polarized antenna feed system and a phase detector provides bipolar video signals.

5 Claims, 3 Drawing Figures

INTRAPULSE POLARIZATION AGILE RADAR SYSTEM (IPAR)

DEDICATORY CLAUSE

The invention described herein was made in the course of or under a contract or subcontract thereunder with the Government and may be manufactured, used, and licensed by or for the Government for governmental purposes without the payment to us of any royalties thereon.

DESCRIPTION OF THE BEST MODE AND PREFERRED EMBODIMENT

The basic principle of this concept lies in the use of intrapulse polarization agility to achieve compression and correlation. The concept has the potential of providing a means of achieving pulse compression that is simpler than current techniques, discriminating between man-made-like objects and natural objects, providing pseudo-short pulsewidths while retaining advantages of larger pulses, and having certain ECCM advantages.

Figure 1:
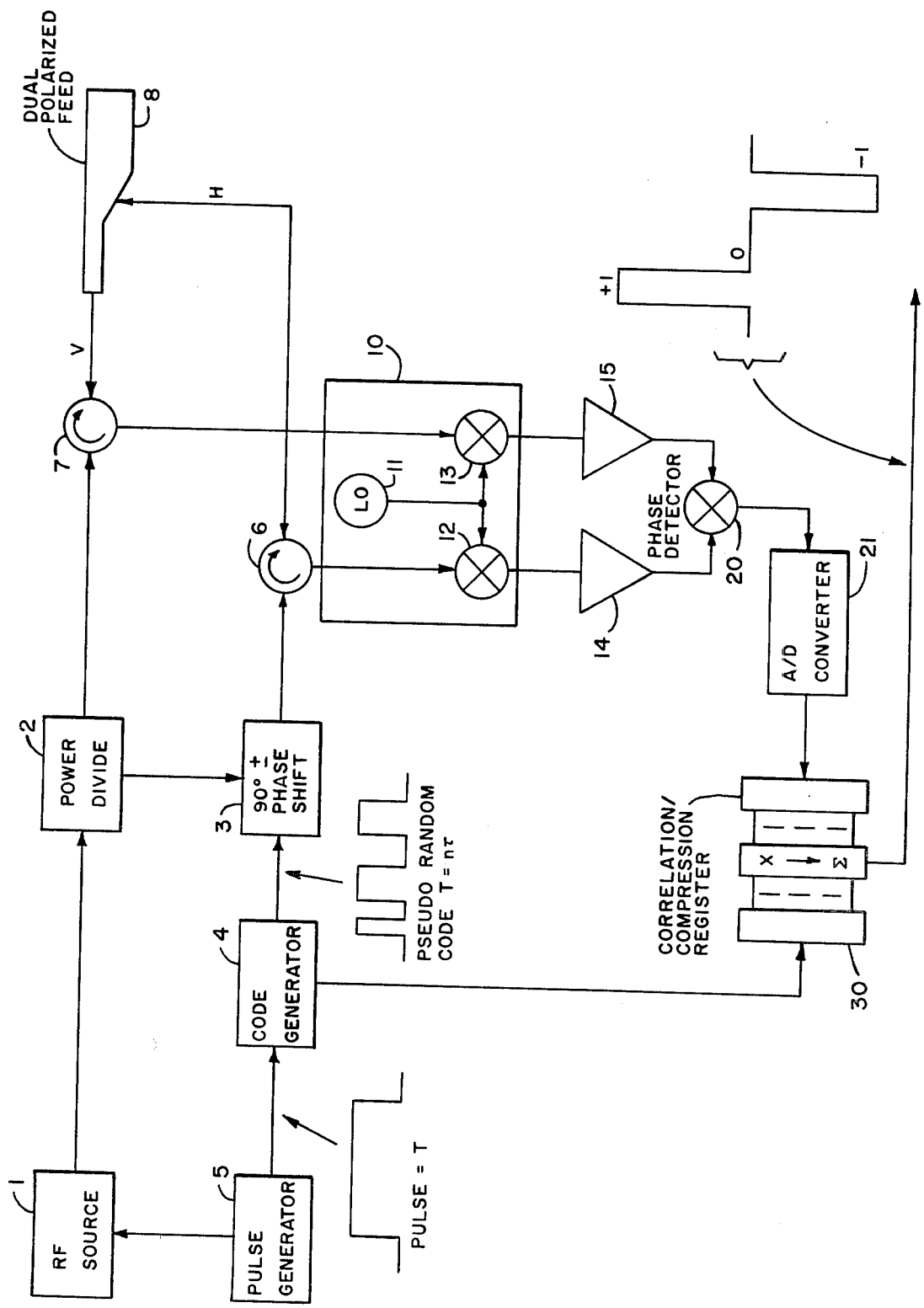
FIG. 1 is a block diagram illustrating the preferred embodiment of the present invention.

A block diagram illustrating the prime functions as shown is FIG. 1. An r-f source 1 of arbitrary frequency (noise or other) provides r-f energy in the correct band and the necessary power level for time interval T determined by pulse generator 5. This power is divided into two components (equal components presently assumed though future considerations may favor other ratios) by power divider 2. One component is shifted in phase by 90° with respect to the other component, phase shifter 3 does the shifting at coded intervals determined by the code generator 4. Generator 4 has a pseudo-random code of $T = n\tau$, where n is the compression ratio. The two components are simultaneously applied through circulator 6 and 7 to a dual polarized antenna feed system 8. The resultant radiation transmitted is either right circularly polarized or left circularly polarized at coded intervals. Power division by ratios other than 1:1 would result in coded elliptical polarizations, dependent on whether the phase shift is ±90° or other amounts.

Even bounce (diplane) targets will produce a bipolar video signal (at the phase detector output) that is identical to the polarization code (pseudo random or otherwise) that drove the phase shifter.

Odd bounce (flat, plate, trihedral, sphere, etc.) targets will produce a dipolar video signal that is exactly 180 degrees out of phase with the polarization code that drove the phase shifter.

Clutter targets (made up of randomly oriented and randomly spaced collections of even and odd bounce scatterers) will produce a bipolar video signal whose phase (positive video or negative video) is random with respect to the bipolar code that drove the phase shifter.

In the example (circular coded) the polarization sense, right or left, is reflected with the same sense or opposite sense polarization for diplane and planar type structures, respectively. The received signal therefore has the same sense or opposite sense polarization for man-made objects of planar and diplane-like structures. Although natural objects, in their composite effect, provide some similar scattering characteristics, they also provide scattering across the spectrum of polarizations from linear (horizontal and vertical) to circular (opposite and same).

Figure 2:
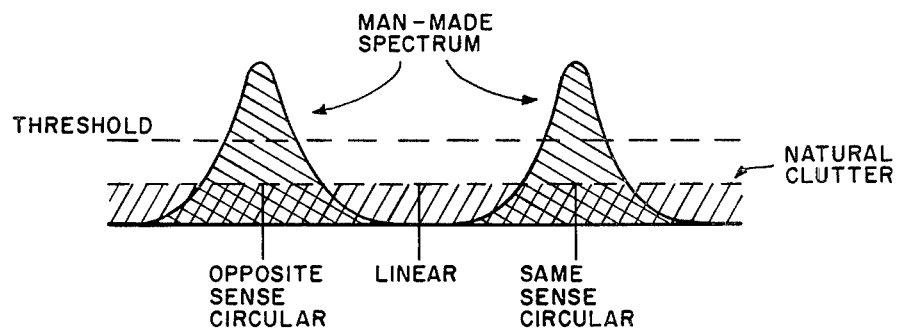
FIG. 2 is a graph illustrating the polarization characteristics of targets and vegetation clutter.

This is shown ideally in FIG. 2. The areas under the man-made spectrum and that of normal clutter are the same. The horizontal and vertical polarization components of the received energy are received and converted to convenient frequencies for amplification in conventional radar fashion. The relative phase between the two components is still retained at i-f.

The vertical and horizontal components of the signals radiated by antenna 8 and reflected by targets in the beam are received separately by feed 8 (FIG. 1) and sent through circulators 6 and 7 to a tuner 10. There they are converted into i-f in conventional manner by local oscillator 11 and mixers 12 and 13. The outputs are then amplified by amplifiers 14 and 15 and sent to a phase detector 20.

Phase detector 20 extracts the phase difference for the component i-f signals. For returns from man-made structures the phase will tend to correspond or be 180° out of phase with that corresponding to the code generated by the phase-code generator 4. Upon transmission, a replica of this code has been stored in the correlation/compression register 30 where it remains until the next transmission.

In other words the vertical horizontal components of the signals reflected by targets in the beam are received separately and sent to the phase detector 20 where bipolar video signals are produced according to the type target (even bounce, odd bounce or clutter) that reflected the signal.

The bipolar video from phase detector 20 will be converted to a digital format via a simple 1 bit plus sign analog-to-digital converter 21 and then clocked into the correlator/compression register 30.

When the digitized bipolar video from an isolated even bounce target is fully clocked into the correlator/compression register, the phase (polarity) of each digital sample of that video will be identical to the phase of the polarization code increment stored in the corresponding opposite register. For example, digitized positive video opposite positive code increments and digitized negative video opposite negative code increments. The correlator in effect multiplies each digital video sample times the corresponding opposite stored polarization code increment and then computes the sum of all the multiplications. Thus, an even bounce target produces a positive correlation (positive times positive produces positive and negative times negative produces positive) for the ONE clock period for which each target video sample exactly matches that of the corresponding stored polarization code.

Similarly, an odd bounce target produces a negative correlation (positive time negative produces negative and negative times positive produces negative) for the ONE clock period for which each digital sample of the target video is of exact opposite polarity to that of the corresponding stored polarization code.

The digitized samples of a clutter signal will have random polarity with respect to the stored polarization code; thus, the summation of the products will not peak (correlate) as they will for the even and odd bounce targets.

From the above explanation it is seen that the IPAR concept compressess a polarization coded transmit signal of length $T=N\tau$ ($N$=no code subintervals and $\tau$=subinterval pulse length) to length $\tau$ for even and odd bounce targets. Furthermore, even bounce targets produce a positive output from the correlator of length $\tau$ and odd bounce targets produce a negative output from the correlator of length $\tau$.

Figure 3:
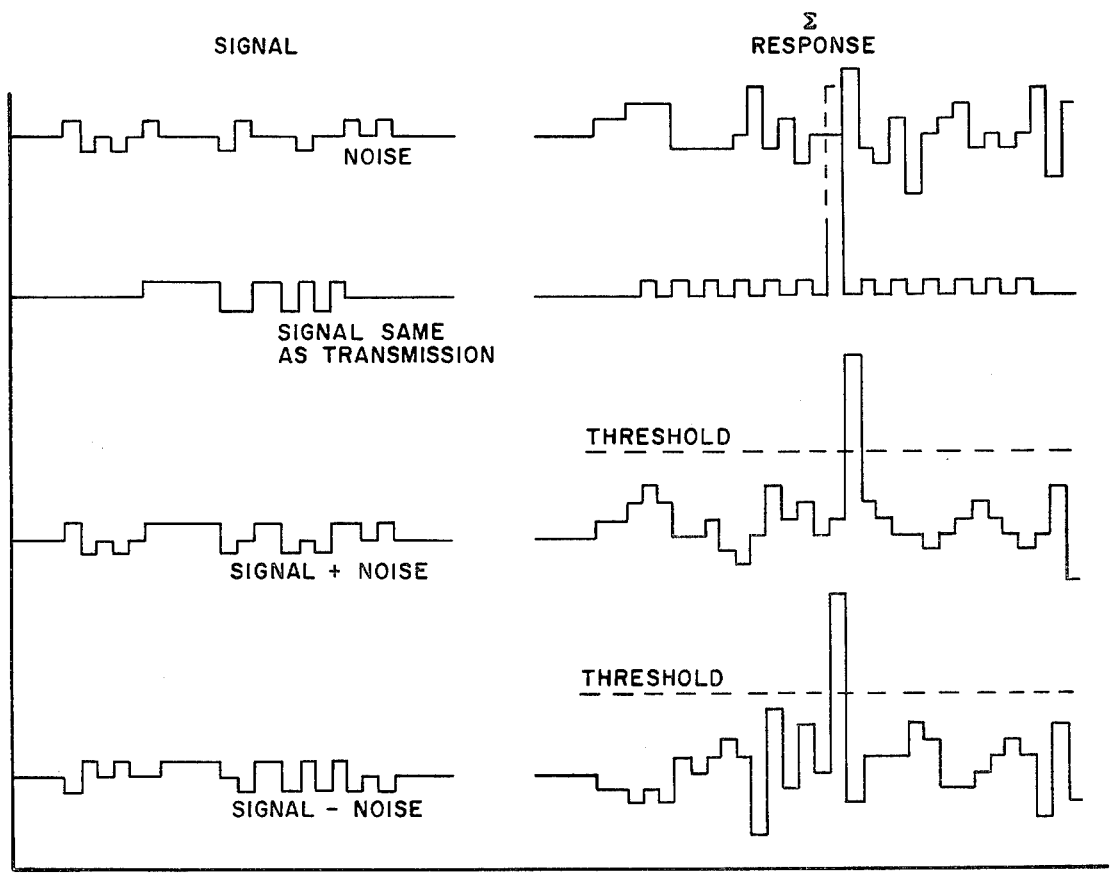
FIG. 3 is a graph illustrating the correlator output versus an assumed biphase code.

Compression is achieved by summing the correlated digital video as shown in FIG. 3. This figure does not show optimum coding but merely the principle involved. Furthermore, the pattern chosen for random clutter was not reduced according to threshold criteria.

Since scattered signals from man-made targets will often be self-defeating as well as being affected by surrounding natural clutter, perfect positive and negative correlation can seldom be achieved. As a result, secondary digital level threshold circuitry will probably be required. This is the level indicated in FIG. 3.

Any of the well known correlation/compression register devices may be used for unit 30 of the present disclosure, such as the correlation/compression register manufactured by TRW Systems Group and described in Quarterly Report No. 16 "High-Speed Low-Power Correlator Development", Apr.–June 1977, Naval Research Laboratory, Washington, D.C. on Contract N00014-73-C-0034.

An unsolicited research proposal entitled "Investigation of a Ground Clutter Reduction Technique for Military Weather Radars," was submitted to USAF. The Georgia Tech proposal number is ST-RD-73-021, Mar. 1973. Also of note is the Eaves, J. L., Trebits, R. N., et al., "Investigation of Target Enhancement Techniques," Final Report AFAL-TR-74-217, Contract F33615-71-C-1612, October 1974.

Some publications relating to this concept are: J. L. Eaves, et al., "An Airborne Investigation of Polarization Diversity for Target Discrimination," Proceedings of the 19th Annual Tri-Service Radar Symposium, July 1973; Brookshire, S. P., Eavse, J. L., and Heckman, J. J., "Improved Target Discrimination with Polarization Agility and Digital Video Processing," 20th Annual Tri-Service Radar Symposium, July 1974; and J. L. Eaves, "Flight Evaluation of Stationary Target Indication Techniques," 22nd Annual Tri-Service Radar Symposium, July 1976.

We claim:

1. A system comprising a source of radio frequency signals; divider means connected to said signals so as to divide the signals into first and second paths; a controllable phase shift means having a controlled input terminal, a main input terminal and an output terminal; said main input terminal being connected to the divider means such that the first path flows through said main input terminal and said output terminal of the phase shift means; a code generator connected to the controlled terminal of the controllable phase shift means so as to cause a phase shift of the radio frequency signals in said first path at selected times in accordance to the code generated by the code generator; a dual polarized feed antenna having horizontal and vertical feeds connected to said first and second paths respectively; a phased detector having first and second inputs and an output; said dual polarized feed antenna transmitting radar signals and detecting vertically and horizontal components of the radar signals reflected by man-made targets and clutter; and first connection means connecting the vertical component to the first input of the phased detector and the horizontal component to the second input of the phased detector, whereby the output of the phased detector will be a video signal which is an indicator as the type target signature that reflected the radar signals.

2. A system as set forth in claim 1 further comprising a processing means having first and second inputs and an output; second connection means connecting the outputs of the phased detector and the code generator to said first and second inputs of the processing means respectively so as to produce at the output of the processing means an output which is enhanced for man-made targets but reduced with respect to clutter.

3. A system as set forth in claim 1 or 2 wherein said phase shift means shifts the phase by 90° upon command from its controlled input terminal so as to provide either right circular polarized or left circular polarized radar signals of the antenna in accordance to the code on the code generator.

4. A system as set forth in claim 3 wherein the code generated by the code generator is pseudo-random.

5. A system as set forth in claim 4 wherein said first connection means includes mixer means for converting the return signals to i-f signals.

* * * * *